United States Patent
Piech et al.

(10) Patent No.: US 10,686,357 B2
(45) Date of Patent: Jun. 16, 2020

(54) DOOR OPERATOR WITH SWITCHED FLUX LINEAR MOTOR

(71) Applicant: OTIS ELEVATOR COMPANY, Farmington, CT (US)

(72) Inventors: Zbigniew Piech, Cheshire, CT (US); Amy Robinson, Middletown, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 380 days.

(21) Appl. No.: 15/594,117

(22) Filed: May 12, 2017

(65) Prior Publication Data

US 2018/0331610 A1 Nov. 15, 2018

(51) Int. Cl.

| H02K 41/03 | (2006.01) |
|---|---|
| H02K 1/17 | (2006.01) |
| B66B 13/08 | (2006.01) |
| E05F 15/60 | (2015.01) |
| E05F 17/00 | (2006.01) |
| B66B 9/00 | (2006.01) |

(52) U.S. Cl.
CPC .......... *H02K 41/033* (2013.01); *B66B 13/08* (2013.01); *E05F 15/60* (2015.01); *E05F 17/004* (2013.01); *H02K 1/17* (2013.01); *B66B 9/00* (2013.01); *E05F 2017/005* (2013.01); *E05Y 2900/104* (2013.01)

(58) Field of Classification Search
CPC ......... H02K 41/031; H02K 41/00–065; H02K 1/17; H02K 21/04; H02K 21/38
USPC .......................................................... 310/181
See application file for complete search history.

(56) References Cited

U.S. PATENT DOCUMENTS

| 5,808,246 A | 9/1998 | Peruggi et al. |
| 5,949,036 A * | 9/1999 | Kowalczyk ............. E05F 15/60 |
| | | 187/316 |
| 9,281,735 B2 | 3/2016 | Gandhi et al. |
| (Continued) | | |

FOREIGN PATENT DOCUMENTS

| CN | 102082490 A | 6/2011 |
| CN | 104065234 A | 9/2014 |
| (Continued) | | |

OTHER PUBLICATIONS

European Search Report for Application No. 18171945.1-1201; dated Sep. 24, 2018; 10 pgs.

(Continued)

*Primary Examiner* — Thomas Truong
(74) *Attorney, Agent, or Firm* — Cantor Colburn LLP

(57) ABSTRACT

A permanent magnet linear motor. The permanent magnet linear motor including a primary comprising a magnetically permeable core having a first face surface on a first side of the core a plurality of teeth forming a plurality of slots on the first side, and a plurality of multi-phase windings wound to have segments thereof in the slots forming a plurality of magnetic poles at each of the first face surfaces; a permanent magnet pair of opposing polarity configured to produce magnetic flux and cause the primary to exert a force on the secondary when the plurality of multiphase windings are excited by a multiphase source; and a passive ferromagnetic secondary adjacent to but spaced from the first face surface, the passive ferromagnetic secondary being moveable with respect to the primary.

22 Claims, 8 Drawing Sheets

(56) References Cited

U.S. PATENT DOCUMENTS

| | | | | |
|---|---|---|---|---|
| 2007/0222304 | A1* | 9/2007 | Jajtic | H02K 1/06 310/12.18 |
| 2007/0236090 | A1* | 10/2007 | Hoppe | H02K 1/06 310/44 |
| 2013/0249324 | A1* | 9/2013 | Gandhi | H02K 41/033 310/12.18 |
| 2014/0091673 | A1 | 4/2014 | Anbarasu et al. | |
| 2014/0232209 | A1* | 8/2014 | Sugita | H02K 41/033 310/12.02 |
| 2016/0297640 | A1 | 10/2016 | Witczak et al. | |
| 2016/0297647 | A1* | 10/2016 | Tangudu | B66B 11/0407 |
| 2016/0304317 | A1 | 10/2016 | Witczak et al. | |

FOREIGN PATENT DOCUMENTS

| | | | | |
|---|---|---|---|---|
| CN | 104319976 | A | 1/2015 | |
| CN | 104426321 | A | 3/2015 | |
| CN | 104753308 | A | 7/2015 | |
| CN | 104167896 | B | 9/2016 | |
| CN | 103595217 | B | 10/2016 | |
| CN | 106253529 | A | 12/2016 | |
| DE | 102007021929 | A1 | 11/2008 | |
| EP | 1919063 | A1 | 5/2008 | |
| WO | WO-2015084366 | A1 * | 6/2015 | B66B 11/0407 |
| WO | 2016206757 | A1 | 12/2016 | |

OTHER PUBLICATIONS

English Abstract for CN103595217B—Oct. 19, 2016; 2 pgs.
English Abstract for CN104065234A—Sep. 24, 2014; 2 pgs.
English Abstract for CN104167896B—Sep. 4, 2016; 1 pg.
English Abstract for CN104319976A—Jan. 2, 2015; 2 pgs.
English Abstract for CN104426321A —Mar. 18, 2015; 1 pg.
English Abstract for CN104753308A—Jul. 1, 2015; 1 pg.
Feng Xiao et al.; "A novel double-sided flux-switching permanent magnet linear motor"; Published Online: Apr. 2015; Journal of Applied Physics 117, 17B530 (2015); Availiable at: http://dx.doi.org/10.1063/1.4919271; 4 pgs.
Jeong, Gyujong et al.; "Acoustic noise and vibration reduction of flux-switching permanent magnet machine for elevator door application"; Electromagnetic Field Computation (CEFC), 2016 IEEE Conference on Electromagnetic Field Computation, available at : http://ieeexplore.ieee.org/document/7816271/, 3pgs.
Yi Du et al.; "A Double-Sided Linear Primary Permanent Magnet Vernier Machine"; Journal List ScientificWorldJournal v.2015; 2015 PMC4385675; ScientificWorldJournal. 2015; 2015: 596091; Published online Mar. 22, 2015. doi: 10.1155/2015/596091; avialiable at: https://www.ncbi.nlm.nih.gov/pmc/articles/PMC4385675151; 9 pgs.
European Search Report for application EP 18171945.1, dated Jan. 17, 2020, U320867EP, 93 pages.

* cited by examiner

DOOR OPERATOR WITH SWITCHED FLUX LINEAR MOTOR

TECHNICAL FIELD

This invention relates to a single switched flux linear motor which drives a pair of secondaries independently, or in the same or opposite directions, and operating center-opening, double or two-speed elevator doors, directly, with a single linear motor and motor drive.

BACKGROUND

Elevator car doors have historically been driven by rotary motors through complex linkages. For center-opening double doors, the complexity of the linkage is even greater. Additionally, rotary door openers are difficult to install and require frequent, costly maintenance.

Some more recent elevator doors employ linear motors wherein the force created between the primary and the secondary is applied directly to the elevator doors to produce corresponding linear motion. While linear door operators are more reliable, requiring little if any maintenance, they can be expensive. For double door configurations, options include having a motor including primary, secondary, back-iron and drive system for each of the door panels; but this is doubly expensive. Another option is to use a single motor to move one panel and relate the other panel to it, with a cable or the like; but such a system is far more difficult to control. Another option is to place the primary on one door panel and the secondary on the other door panel; this requires both parts of the motor to move, increasing the moving mass in the door system and requiring a moving cable to the motor winding. Two-speed door sets require one motor mounted on the slow door to drive the fast door and one motor mounted on the cab (or on the slow door) to drive the slow door, or single motors using relating cables.

SUMMARY

According to an embodiment, disclosed herein is a permanent magnet linear motor. The permanent magnet linear motor including a primary comprising a magnetically permeable core having a first face surface on a first side of the core a plurality of teeth forming a plurality of slots on the first side, and a plurality of multi-phase windings wound to have segments thereof in the slots forming a plurality of magnetic poles at each of the first face surfaces; a permanent magnet pair of opposing polarity configured to produce magnetic flux and cause the primary to exert a force on the secondary when the plurality of multiphase windings are excited by a multiphase source; and a passive ferromagnetic secondary adjacent to but spaced from the first face surface, the passive ferromagnetic secondary being moveable with respect to the primary.

In addition to one or more of the features described above, or as an alternative, further embodiments may optionally include a second face surface on a second side of the core opposite to the first side, the second face surface including a second plurality of teeth forming a second plurality of slots on the second side, and a second plurality of multi-phase windings wound to have segments thereof in the slots forming a plurality of magnetic poles at each of the second face surfaces.

In addition to one or more of the features described above, or as an alternative, further embodiments may optionally include a second passive ferromagnetic secondary adjacent to but spaced from the second face surface and moveable with respect to said core independently of said first ferromagnetic secondary.

In addition to one or more of the features described above, or as an alternative, further embodiments may optionally include that the first polarity of multiphase windings and the second polarity of multiphase windings are arranged in a manner and excited in a manner to cause the first secondary and the second secondary to move in opposite directions.

In addition to one or more of the features described above, or as an alternative, further embodiments may optionally include that the windings on said first side of said core are wound to have the same mutual phase relationship to each other when viewed from said first side as the mutual phase relationship which said windings on said second side have, when viewed from said second side, whereby to drive said secondaries in mutually opposite directions.

In addition to one or more of the features described above, or as an alternative, further embodiments may optionally include that the windings on said first side are wound to be phase reversed, when viewed from the top, from windings on said second side, whereby to drive said secondaries in opposite directions.

In addition to one or more of the features described above, or as an alternative, further embodiments may optionally include a linear motor drive for supplying currents to at least one of the first plurality of multiphase windings and the second set of multiphase windings for selectively driving each respective secondary in either one of two directions in dependence on the phase relationships of said currents.

In addition to one or more of the features described above, or as an alternative, further embodiments may optionally include a linear motor drive for supplying currents to at least the windings in slots of said first face surface for selectively driving the secondary in either one of two directions in dependence on the phase relationships of said currents.

In addition to one or more of the features described above, or as an alternative, further embodiments may optionally include that the first plurality of multiphase windings are wound so as to provide magnetic poles on the first side and on the second side, the poles on the first side having polarity opposite to polarity of the poles on the second side, whereby to drive the secondaries in mutually opposite directions.

In addition to one or more of the features described above, or as an alternative, further embodiments may optionally include that the permanent magnet pair is at least one of disposed at an end of the teeth distal from the ferromagnetic core and forming closed slots, disposed in the ferromagnetic core and magnetized along its length, disposed in the ferromagnetic core and magnetized along its width, and alternatingly disposed in between two portions of a tooth having a winding encompass it.

In addition to one or more of the features described above, or as an alternative, further embodiments may optionally include that the passive ferromagnetic secondary is configured with salient portions and non-salient portions substantially uniformly distributed along at least a portion of the length of the secondary.

In addition to one or more of the features described above, or as an alternative, further embodiments may optionally include that the non-salient portions are formed by punching or removing ferromagnetic material In addition to one or more of the features described above, or as an alternative, further embodiments may optionally include that the salient portions are positioned at a pitch different that a pitch of the teeth of the primary In addition to one or more of the features described above, or as an alternative, further embodiments may optionally include that the salient portions are oriented at an angle orthogonal to the force exerted on the secondary by the primary.

In addition to one or more of the features described above, or as an alternative, further embodiments may optionally include that the salient portions are oriented at an angle less than orthogonal relative to the force exerted on the secondary by the primary.

In addition to one or more of the features described above, or as an alternative, further embodiments may optionally include that the salient portions and non-salient portions are formed by pressing and forming corrugations in the ferromagnetic material In addition to one or more of the features described above, or as an alternative, further embodiments may optionally include that the corrugations are formed such that the depth D of the corrugations is at least 2.5 times the gap between the primary and the salient portions.

In addition to one or more of the features described above, or as an alternative, further embodiments may optionally include that the salient portions include an angled portion angled relative to a face of the salient portion.

In addition to one or more of the features described above, or as an alternative, further embodiments may optionally include that the first and second loads are mutually adjacent doors.

In addition to one or more of the features described above, or as an alternative, further embodiments may optionally include that the doors are elevator doors.

In addition to one or more of the features described above, or as an alternative, further embodiments may optionally include that the primary is disposed on an elevator car and said doors comprise a pair of center-opening double doors.

Also described herein in another embodiment is a double sided switched flux linear motor for selectively driving first and second secondaries independently. The double sided permanent magnet linear motor including a magnetic permeable core having a first face surface on a first side of the core and a second face surface on a second side of the core opposite to the first side, a plurality of teeth forming a plurality of slots formed on each of the surfaces, and a plurality of multi-phase windings wound to have segments thereof in the slots forming a plurality of magnetic poles at each of said first and second face surfaces, and a permanent magnet pair of opposing polarity configured to direct magnetic flux to the magnetically permeable core. The switched flux linear motor also includes a first passive ferromagnetic secondary adjacent to but spaced from the first face surface and moveable with respect to the core, and a second passive ferromagnetic secondary adjacent to but spaced from the second face surface and moveable with respect to said core independently of said first conductive secondary.

In addition to one or more of the features described above, or as an alternative, further embodiments may optionally include a pair of elevator doors, each affixed to one of said secondaries, whereby the elevator doors are moved in mutually opposite directions by said secondaries.

In addition to one or more of the features described above, or as an alternative, further embodiments may optionally include that the core is disposed on an elevator car and said doors comprise a pair of center-opening double doors.

Technical effects of embodiments of the present disclosure include a system for and switched flux linear motor for operating an elevator car door mechanism in an elevator system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
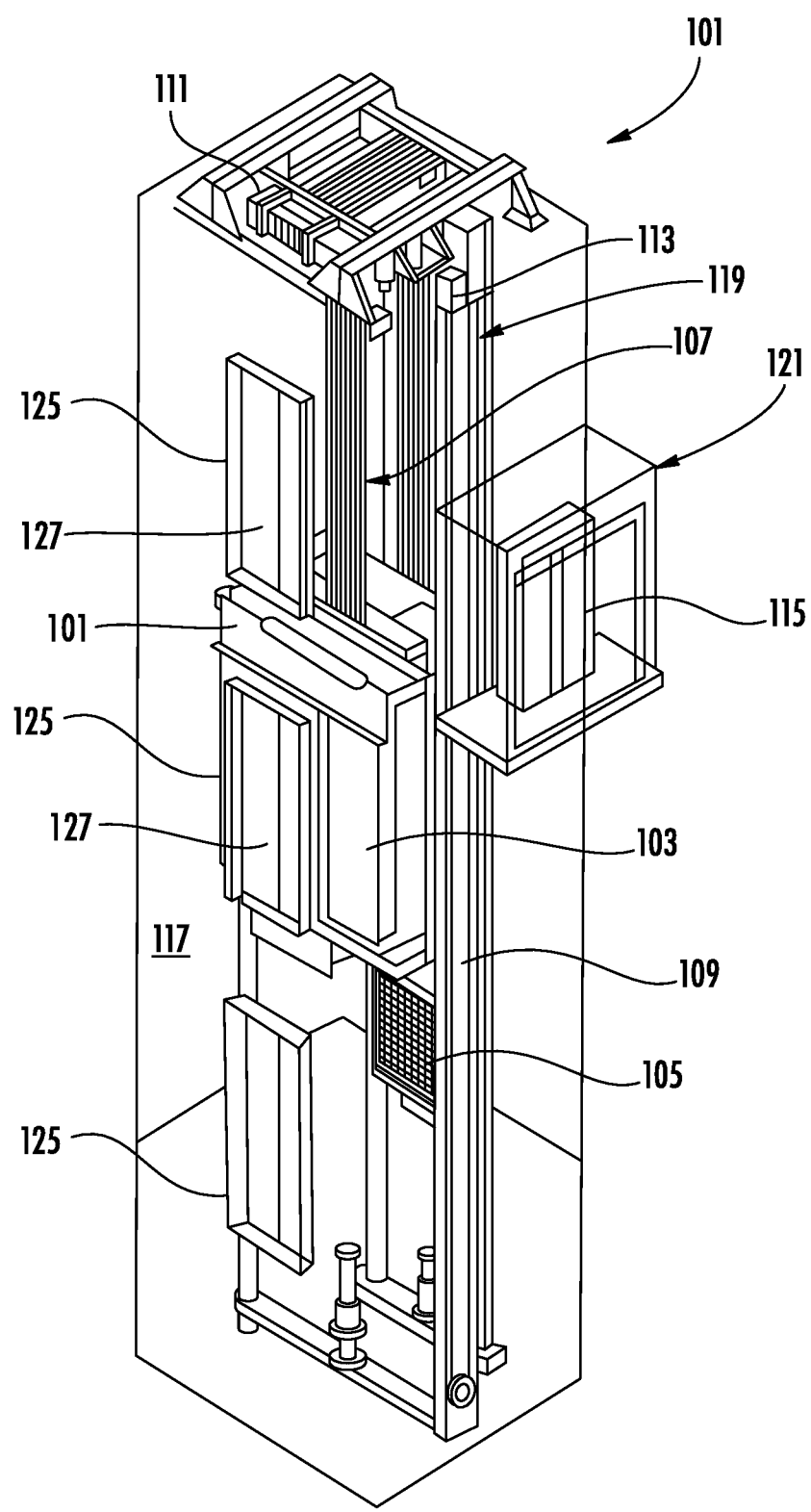
FIG. 1 is a schematic illustration of an elevator system that may employ various embodiments of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 is a perspective view of an elevator system 100 including an elevator car 103, a counterweight 105, roping 107, a guide rail 109, a machine 111, a position encoder 113, and a controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109. Although shown and described with roping 107, elevator systems 100 that employ other methods and mechanisms of moving an elevator car 103 within an elevator shaft 117 may employ embodiments of the present disclosure. FIG. 1 is merely a non-limiting example presented for illustrative and explanatory purposes.

The roping 107 engages the machine 111, which is part of an overhead structure of the elevator system 100. The machine 111 is configured to control movement between the elevator car 103 and the counterweight 105. The machine 111 may include a motor or similar driving mechanism. In accordance with embodiments of the disclosure, the machine 111 is configured to include an electrically driven motor. The power supply for the motor may be any power source, including a power grid, generator, batteries and the like. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

In general, the controller 115 may receive one or more input signals/information corresponding to various components of the elevator system 100 to facilitate elevator system operations, diagnostics, maintenance, and the like. The input signals/information may include, but are not limited to, a position signal from the position encoder 113, car load weight, brake status, car door status, door switch signal(s), car input power, car calling status, service operation mode status, door position, car emergency status, input power status, and the like. Based on the information, the controller 115 determines the status of, and provides commands to, the elevator system 100 including one or more elevator cars 103. For example, the controller 115 may provide drive signals to the machine 111 to control the acceleration, deceleration, leveling, stopping, etc. of the elevator car 103. In addition, the controller 115 may control the elevator car door (not shown), annunciators, and the like. In the figure, the controller 115 is located, as shown, in a controller room 121 of the elevator shaft 117. It should be appreciated that while a particular placement for the controller 115 and other components of the elevator system 100 is shown, this is for example only to facilitate illustration and is in no way limiting. Likewise, while a single controller 115 is disclosed for the purposes of illustration, a modular or distributed configuration could also be employed with various functions allocated as need be.

The controller 115 may also receive signals from other on board sensors such as a presence detector 101 to facilitate determining if any passengers are in the elevator car 103. In one embodiment the presence detector 101 may include, but not be limited to, a standard proximity sensor, passive infrared (PIR) sensor, motion detector, radar sensor, optical sensor, an image/video camera, and the like. Other presence detectors 101 might include touch sensitive sensors placed in the vicinity of a user interface, for example, touch sensitive detectors in the elevator car 103, or even a floor mat that detects whether a passenger is standing in the elevator car 103. The presence detector 101 may be installed at a variety of locations as may suit the application and environment. Certain presence detectors 101 may be installed so that their range and field of view are such that it limits false detections. Further still, selected presence detectors 101 may be installed to limit detection to a single passenger. For example, the presence detector 101 may be installed as a proximity detector above, below, or directed radially outwardly from a corner in the elevator car 103.

Linear induction motors have been employed in elevator door operations for quite some time. In most systems the force created between the primary and the secondary is applied directly to the elevator doors to produce corresponding linear motion. Advantageously, in part due to their simplicity, linear motor door operators are very reliable, requiring little maintenance. However, in comparison to conventional designs with rotary motors, they are expensive, difficult to control, and require significantly more power. Described herein is a switched flux permanent magnet ((SFPM) and (PM)) linear motor door operator design that provides the advantages of conventional linear motor operators at reduced cost, with significantly higher power density, resulting in simplified control techniques and reduced size and power consumption. Moreover, the described embodiments simplify the configuration of a door operator for double door configurations, by providing for a simplified motor configuration with moving passive secondaries attached to the elevator doors driven by fixed opposing primaries. This simple configuration eliminates hardware, weight, and cost for the overall door operator 130.

Figure 2A:
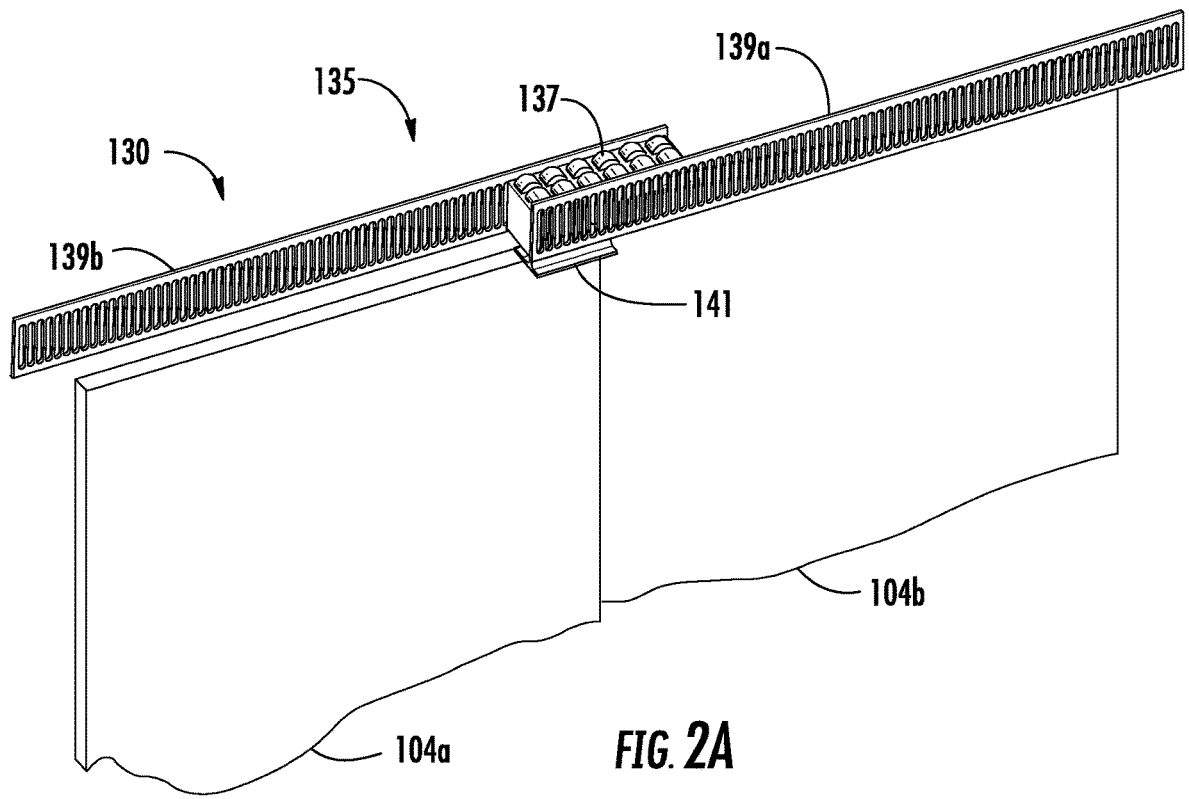
FIG. 2A is a perspective view of a door opener with elevator doors in the closed position in accordance with an embodiment.
Figure 2B:
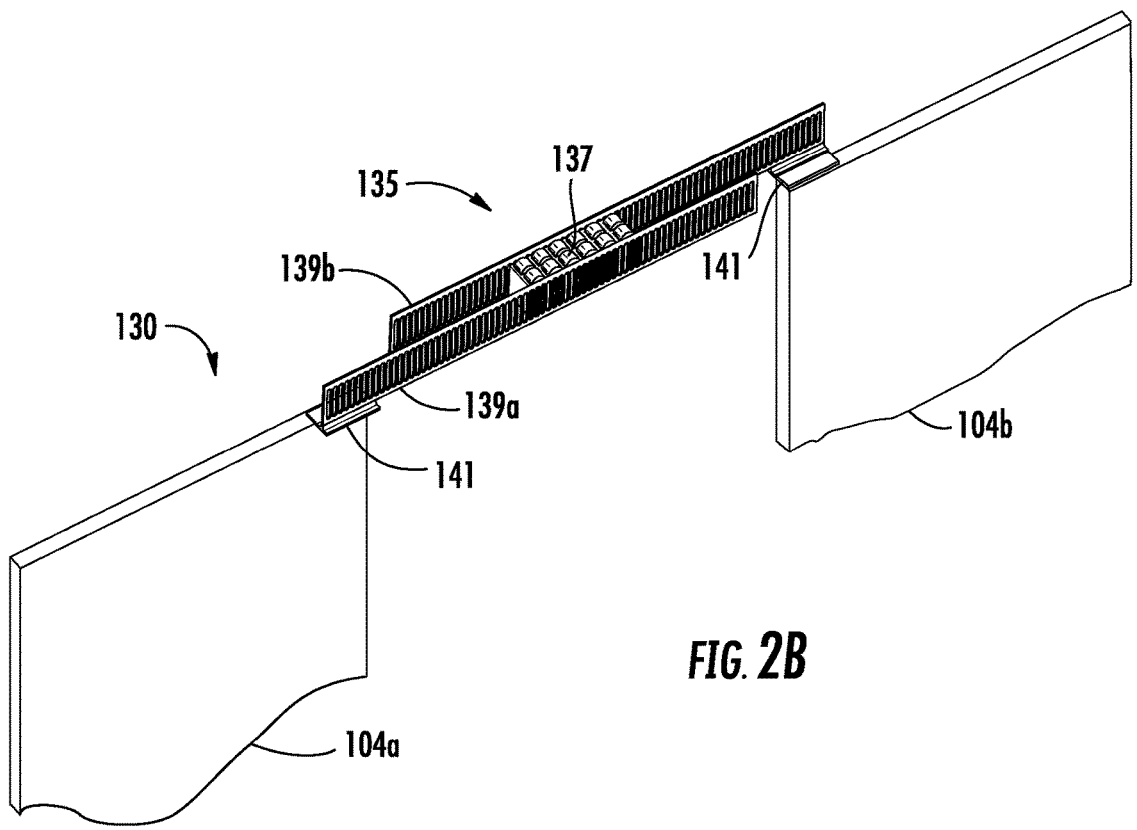
FIG. 2B is a perspective view of a door opener with elevator doors in the open position in accordance with an embodiment.

Turning to FIGS. 2A and 2B, FIG. 2A shows a partial view of a pair of center opening elevator car door(s) 104a, 104b (two are shown in this instance) shown in a closed position. Each of the doors 104a, 104b is typically fastened to a door hanger which is supported by mutually opposing rollers which roll on a track fastened to the lintel above the elevator car door opening on the elevator car 103.

As is typical in such installations, the elevator car door 104 is actuated by a door operator shown generally as 130, in operable communication with controller 115 (not shown), typically disposed atop the elevator car 103 (FIG. 1). Conventional door operator systems may employ a rotary motor pulleys and a drive belt or other drive mechanism to actuate the elevator car doors 104. FIG. 2A depicts the elevator car doors 104 in a closed position. In the described embodiments, a bidirectional, dual primary, switched flux permanent magnet linear motor is operating in a fixed center-opening configuration. FIG. 2B shows the arrangement of FIG. 2A where the elevator car doors 104 are in an opened position.

In most elevator installations, a door coupler (not shown) disposed on the elevator car door 104 engages with a corresponding protrusion which extends inwardly from the landing door 127 (FIG. 1) to provide a simple and effective means for enabling the door coupler to engage and move the landing door 127 upon and concurrently with operation of the elevator car door 104. The door coupler typically also includes a door interlock configured to permit the door coupler or door operator 130 to operate only once it has been determined that the elevator car 103 is positioned within a landing door zone, adjacent at least one landing door 127, to ensure that the elevator doors 104 or landing doors 127 are not opened or openable when the elevator car 103 is not at a landing.

Continuing with FIGS. 2A and 2B, in an embodiment, a single SFPM linear motor 135 is fastened to the top of the elevator car 103, or to the lintel above the landing doors 127 or otherwise to the building in any suitable way. As seen more clearly in FIG. 2A, the motor 135 has a two sided primary 137 and two secondaries 139a, and 139b (for a dual door configuration) on opposing sides of the primary 137, each connected by a suitable link and/or bracket 141 to a corresponding door 104a, 104b. In an embodiment, the two sided primary 137 is fixed and disposed, substantially at the center of the doors 104a, 104b. Each of the secondaries 139a, 139b has a length to correspond substantially with the width of the doors 104a, 104b (or at least the travel of each of the two doors 104a and 104b while at least fully overlapping the primary 137 fully at both the open and closed positions). In an embodiment, the full overlap is desired, though not required, to ensure that the linear motor 135 can develop the full force possible to ensure opening and closing the elevator doors 104a and 104b.

In an embodiment, when the elevator doors 104a and 104b are closed, the secondary 139a, is disposed at the primary 137 and to the right and over that portion of the elevator door 104b. Likewise, the secondary 139b, is disposed at the primary 137 and to the left and over that portion of the elevator door 104a. However, with reference to FIG. 2B, when the door 104a is opened, the secondary 139a is disposed at the primary 137 and above the opening of elevator door 104a. Likewise, when the door 104b is opened, the secondary 139b is disposed at the primary 137 and above the opening of the door 104b. It will be appreciated that the width of the secondary 139a and 139b need only correspond to the desired travel of the elevator doors 104a and 104b. For example, in an embodiment, the secondary 139a and 139b need only be as long as the travel of either elevator door 104a, 104b and the length of the primary 137 for which overlap is desired.

Continuing with FIGS. 2A and 2B, the secondaries 139a and 139b are maintained in close proximity to the side faces 152 and 154 (See FIG. 3 and FIG. 4) respectively of the primary 137. The close proximity ensures maintaining sufficient electromagnetic coupling to the secondaries 139a and 139b for the generation of electromotive forces in the secondaries 139a and 139b. In an embodiment, the gap between the two sided primary 137 and the secondaries 139a and 139b is maintained at less than about one fifth of the primary core tooth pitch. However other gaps may be employed and desirable depending on the construction and operation of the primary 137 as well as the secondaries 139a and 139b. In addition, to aid in maintaining the spacing between the two sided primary 137 and the secondaries 139a and 139b, a non-metallic spacer or guide 155 (FIGS. 3&4) may be employed, for example, along height (or length) of the primary 137 on each side. Alternatively, or in addition, such spacers or guides 155 could also be employed on the secondaries 139a and 139b. The spacers prevent any contact between two sided primary 137 and the secondaries 139a and 139b. In one embodiment the thickness of spacers is defined by the bending mode of secondaries 139a and 139b under normal attractive force exerted by the primary 137 In an embodiment, conventional guides 155, formed of any material having a suitable sliding surface, such as NYL-ATRON®, may be used to maintain proper clearance, as is known. The primary 137 and drive motor 132 disclosed herein is but an example of a drive motor employing the invention. Obviously, the drawings are not all to a common scale. The secondaries 139a, 139b may well be planar, box, I or C cross sections, and the system may take different forms. Core 150 and the primary 137 could be of a different cross sectional configuration and may have different relative dimensions.

Figure 3:
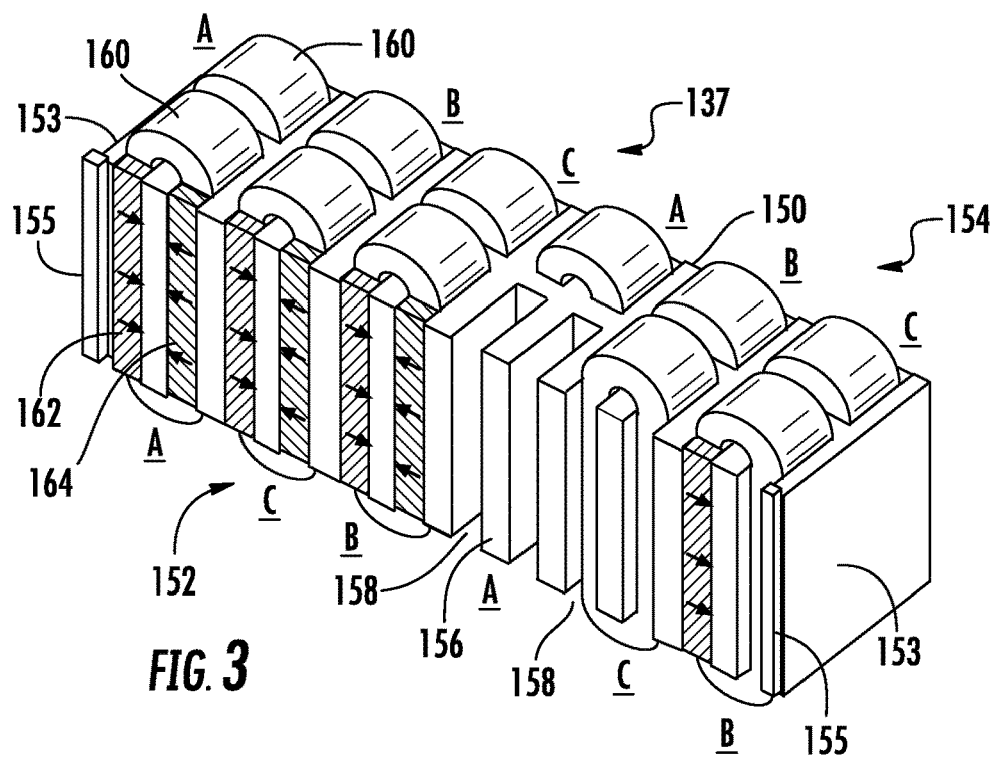
FIG. 3 is a perspective view of the primary of a door opener motor in accordance with an embodiment.
Figure 4:
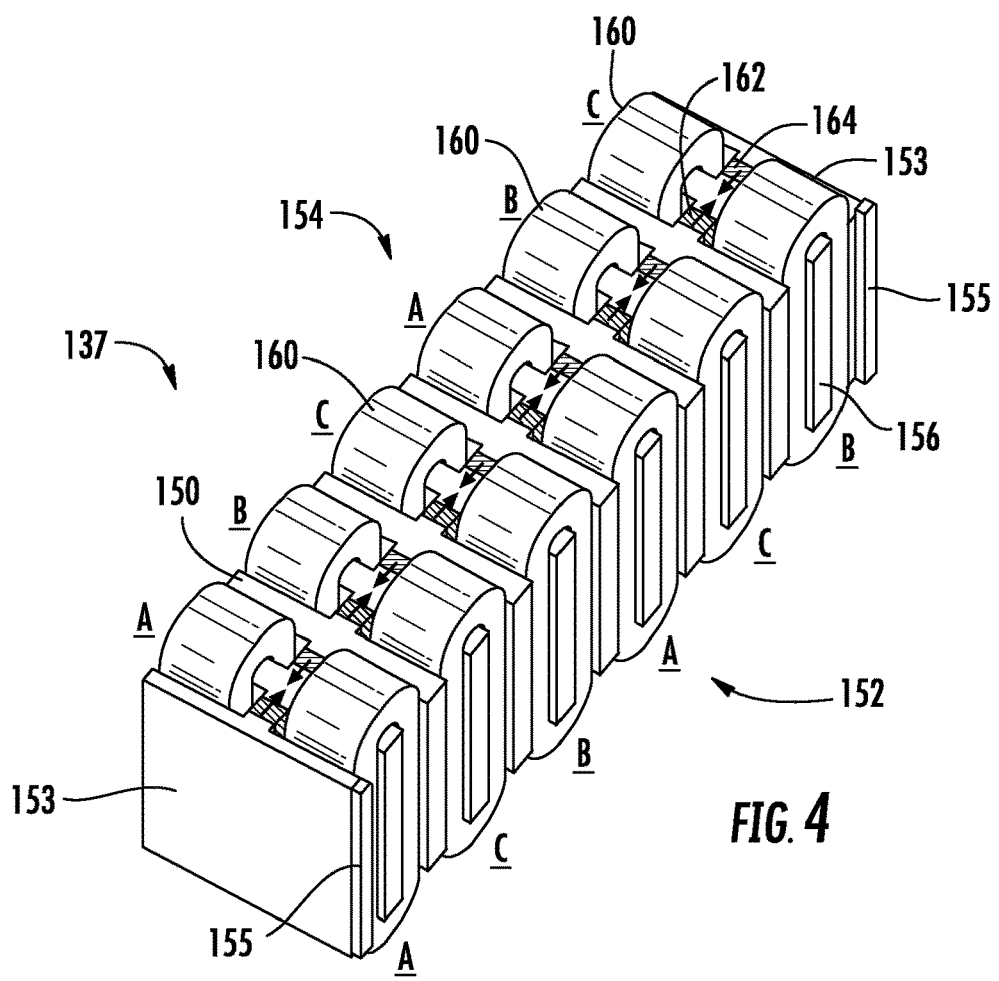
FIG. 4 is a perspective view of the primary of a door opener motor in accordance with another embodiment.

FIGS. 3 and 4, depict two embodiments of the two sided primary 137 of the PM linear motor 135. The two sided primary 137 is a multiple-pole stator typically of a multi-phase alternating current (AC) type. The primary 137 has a ferromagnetic core 150 which is formed of a magnetically permeable material, typically iron. Primary 137 has opposite face surfaces 152, 154 and closed ends 153 with open ferromagnetic teeth 156 coupled to and formed with the core 150 along its length on each of the opposite first and second face surfaces 152, 154. The teeth 156 and closed ends 153 forming "E" shaped slots 158 therein so as to provide for the windings 160. In FIG. 3 one of the sets of slots 158 is depicted without a coil/winding 160 and permanent magnets (PMs) 162, and 164 for clarity. In an embodiment, each of the teeth 156 have a first end proximate the core and a second end distal from the core and thereby, proximate the respective face surfaces 152, 154 of the secondaries 139a and 139b respectively. The slots 158 may be closed with the placement of permanent magnets (PM) 162, 164 of opposing polarities. The PMs 162, 164 are arranged in a linear arrangement alternating along the width of the primary 137 closing the slots 158. The PMs 162, 164 are magnetized tangentially, that is, the PMs 162, 164 are substantially rectangular in shape, having two longer sides corresponding to the height of the core 150. In addition, the polarity of PMs, i.e., magnetization vector, is in tangential direction. The polarity of PMs 162, 164 is shown in FIG. 3. In an embodiment, the magnetization of magnets 162, 164 is in opposite directions and opposing. The magnets 162, 164 are positioned next to each of the teeth 156 (on each side of tooth) and magnets 162, 164 are pointing to the tooth 156 or out of it that is surrounded by a coil or winding 160. That is, the polarity of magnet 162 is S-N toward right (into the tooth) and polarity of magnet 164 is S-N toward left to the same tooth 156. As a consequence of this configuration and magnetization, the next tooth see magnetization of its two neighboring magnets out of it, or in the opposite direction.

In another embodiment, as depicted in FIG. 4, the PMs 162, 164 are embedded in the core with the primary 137 having open teeth 156 and slots 158. In this embodiment, the PMs 162, 164 are arranged in a linear arrangement alternating along the length of the primary 137. The PMs 162, 164 are magnetized tangentially, that is, the PMs 162, 164 are substantially rectangular in shape, having two longer sides corresponding to the height of the core 150. In addition, the polarity of PMs, i.e., magnetization vector, is in tangential direction. The polarity of PMs 162, 164 is shown in FIG. 4. The magnets 162, 164 are positioned in the core 150 in opposing directions. That is, the polarity of magnet 162 is S-N toward right (toward the right end of the core) and polarity of magnet 164 is S-N toward left end of the core 150. There is a ferromagnetic material (core 150) surrounding the PMs 162, 164. Magnetic poles are created in the ferromagnetic material between PMs 162, 164. Advantageously in this embodiment the flux generated by the PMs 162, 164 may be shared by the coil/winding 160 associated with the primary on the first face 152 as well as the winding 160 associated with the second primary on the second face 154 in embodiments where the primary 137 is double sided In an embodiment, the ferromagnetic core 150 and teeth 156 may be constructed of any variety of ferromagnetic materials including, but not limited to steel laminations, sintered magnetic powder material (e.g., Somaloy™), or solid ferromagnetic material such a steel. In one embodiment steel laminations are employed. In one embodiment, the stator core is made from a sintered soft magnetic composition of ferromagnetic powder. In another embodiment, the core 150 and/or teeth 156 are made from a mixture of a curable material (e.g., resin) and soft ferromagnetic powder. In another embodiment, the core and/or teeth are made from a mixture of a curable material (e.g., polymers and/or concrete) with a ferromagnetic material (e.g., ferromagnetic powder and/or ferromagnetic metal).

Figure 5A:
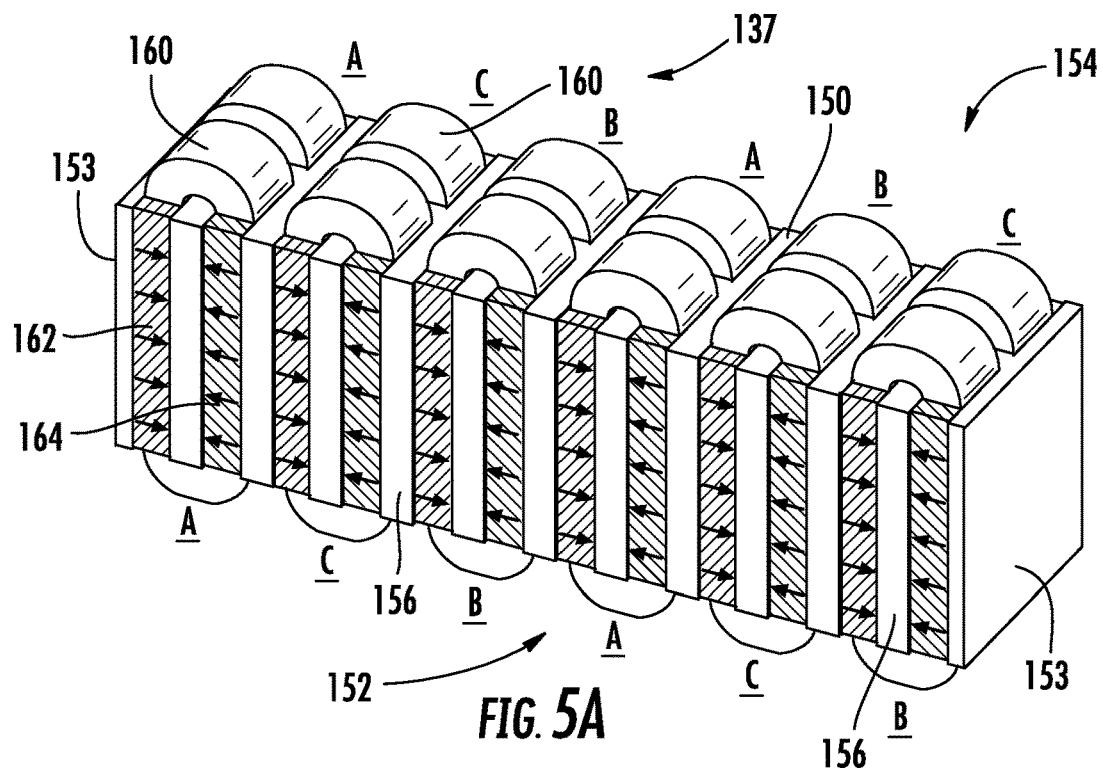
FIG. 5A is a perspective view of the primary of a door opener motor of FIG. 3 with permanent magnets in accordance with an embodiment.
Figure 5B:
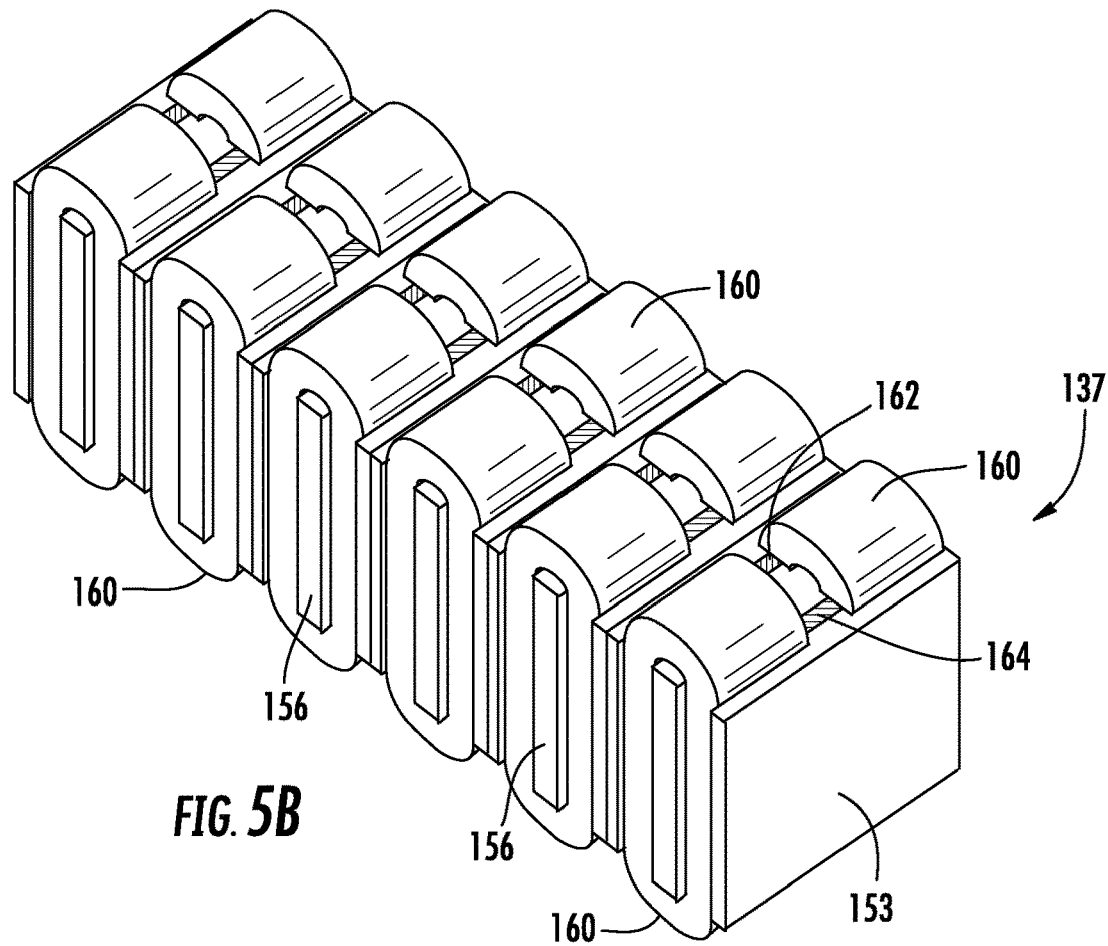
FIG. 5B is a perspective view of the primary of a door opener motor of FIG. 4 with permanent magnets in accordance with an embodiment.

FIG. 5A is an illustration of the primary 137 of the PM linear motor 135 in accordance with an embodiment where the primary has PMs 162, 164 closing the open ferromagnetic teeth 156. FIG. 5B depicts another embodiment, such as depicted in FIG. 4, where the PMs 162, 164 are embedded in the core 150 with the primary having open teeth 156 and slots 158. In this embodiment, the PMs 162, 164 are arranged in a linear arrangement in the core 150 alternating along the length of core 150 and the primary 137. In this embodiment, the PMs 162, 164 are arranged in a linear arrangement alternating along the length of the primary 137. The PMs 162, 164 are magnetized tangentially, that is, the PMs 162, 164 are substantially rectangular in shape, having two longer sides corresponding to the height of the core 150. In addition, the polarity of PMs, i.e., magnetization vector, is in tangential direction. The magnets 162, 164 are positioned in the core 150 in opposing directions. That is, the polarity of magnet 162 is S-N into the paper (toward the second face 154) and polarity of magnet 164 is S-N out of the paper toward the first face 152. There is a ferromagnetic material (core 150) surrounding the PMs 162, 164. Magnetic poles are created in the ferromagnetic material between PMs 162, 164. Advantageously in this embodiment the flux generated by the PMs 162, 164 may be shared by the coil 160 associated with the primary on the first face 152 as well as the winding 160 associated with the second primary on the second face 154 in embodiments where the primary 137 is double sided.

Figure 5C:
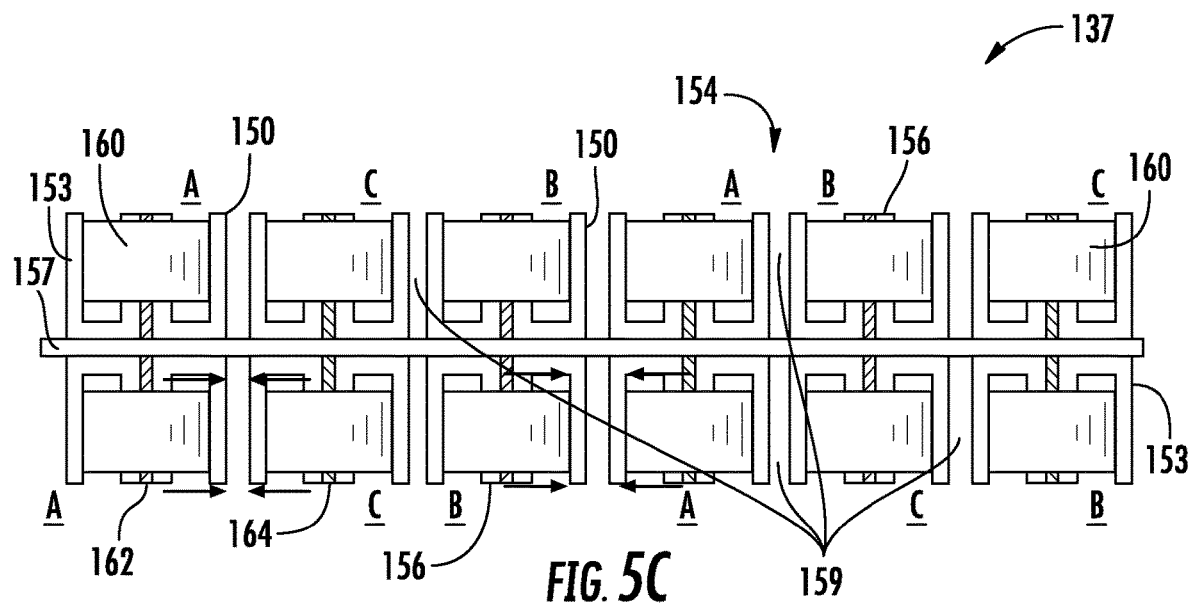
FIG. 5C is a plan view of the primary of a door opener motor of another embodiment with permanent magnets and gaps in accordance with an embodiment.
Figure 5D:
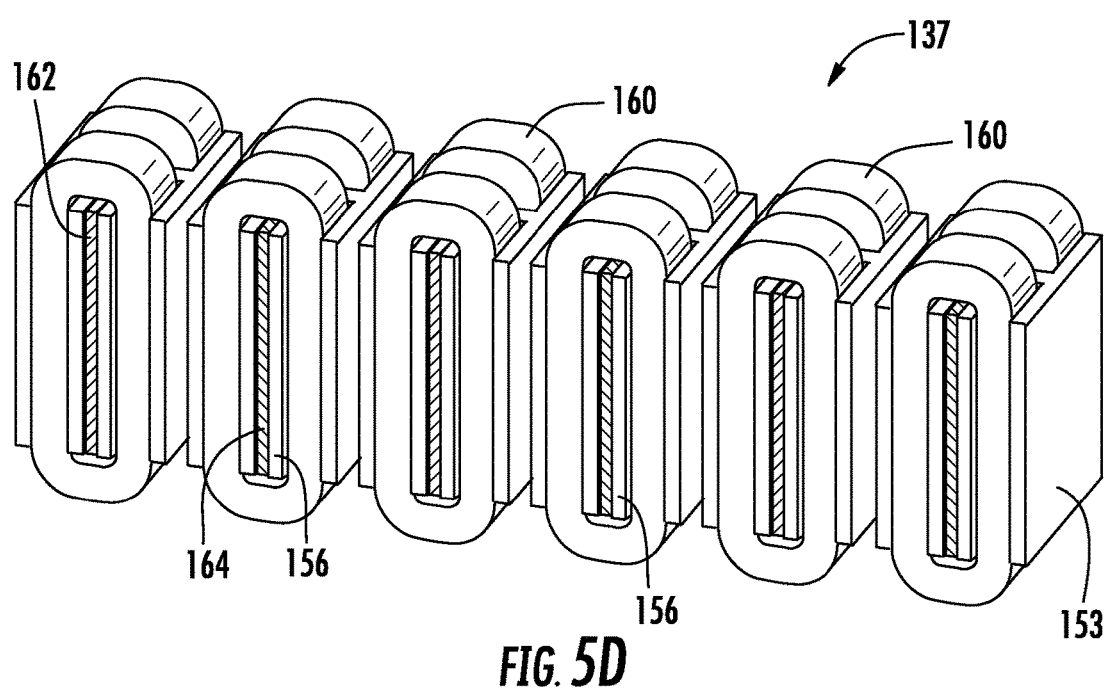
FIG. 5D is a perspective view of the primary of a door opener motor of FIG. 5C in accordance with an embodiment.

FIGS. 5C & 5D depict yet another embodiment for configuration of the primary 137. In this embodiment, which is similar to the embodiments of FIGS. 5A and 5B, however the core 150 is split and sectioned as shown and the PMs 162, 164 are embedded (sandwiched) in the stator teeth 156 around which the coils 160 are placed. The central structure 157 can be part of the core 150 or can be structure or a mounting plate. The gaps 159 between the core 150 structure provide the necessary separation of primary 137 and secondary 139a and 139b and ensure reduction of thrust ripple. In an embodiment, the gap size may also be varied between poles to facilitate reduction in thrust ripple. In some instances the variation may be repetitive for respective poles, in other embodiments it need not be. The PMs 162, 164 are magnetized tangentially, that is, the PMs 162, 164 are substantially rectangular in shape, having two longer sides corresponding to the height teeth 156 of the core 150. In addition, the polarity of PMs, i.e., magnetization vector, is in tangential direction. That is, they are magnetized across the thickness, e.g. magnet 162 is magnetized to the right in tangential direction along the whole primary part structure 137. Likewise, magnet 164 is magnetized into the left in the direction of the length of the primary 137. This magnetization is alternatingly repeated down the length of the structure of the primary 137. The polarity of PMs 162, 164 is shown in FIGS. 5C & D. There is a ferromagnetic material between the PMs 162, 164. Magnetic poles are created in the ferromagnetic material surrounding PMs 162, 164.

Returning to FIG. 3 and FIG. 4, the primary also includes excitation coils or windings 160 forming a multiphase alternating current stator. The windings 150 are formed of individual phase coils 160 arranged in an alternating phase format along the length of the primary with one coil 160 filling two adjacent slots 158. In an embodiment the first side 154 of the primary includes six coils arranged as phases A, B, C, A, B, C, while the opposing side is arranged A, C, B, A, C, B. Coils or windings 160 may be arranged in a plurality of phases (e.g., three phases). Coils 160 may be formed using electrical conductors (e.g., wires, tape) such as copper or aluminum. Advantageously, using aluminum (e.g., wires or tape) for coils 160 reduces the mass of the primary 137 and reduces the cost of installation.

The coils 160 may be operably connected to a source of electrical current e.g., a controller or driver such as controller 115 (FIG. 1). The controller 115 may provide multi-phase current as is known in the art. For example, the linear motor illustrated in FIGS. 3 & 4 is a three-phase machine that can receive the three alternating currents A, B, C of a three-phase electrical source. In such a three-phase system, three groups of coils 160 (A, B, C) each carry one of the three alternating currents of the same frequency which reach their peak values at one third of a cycle from each other. As illustrated in FIGS. 3 & 4, the coils 160 identified as A carry the A phase, the coils identified as B carry the B phase, and the coils 160 identified as C carry the C phase.

A controller 115 provides drive signals to the two sided primary 137 to control imparting force on the secondaries 139a, 139b resulting in motion of the elevator car doors 104. Controller 115 may be implemented using a general-purpose microprocessor executing a computer program stored on a storage medium to perform the operations described herein. Alternatively, controller 115 may be implemented in hardware (e.g., ASIC, FPGA) or in a combination of hardware/ software. Controller 115 may also be separate or part of an elevator system 100. Controller 115 may include power circuitry (e.g., an inverter or drive) to power the primary 137.

In each case, a coil 160 on the first face 152 for phases A, C, B includes operating with a current in a direction to cause a thrust to drive the secondary 139*b* to the right. Likewise, reversing the sequence of phases would cause the secondary 139*b* to be driven to the left. Similarly, coil 160 adjacent the opposite surface 154, with currents flowing for poles A, B, C, will drive the secondary 139*a* to the left, The relationship between the coil 160 is, however, irrelevant and they only need be connected to a three phase control in the sequence needed to arrange imparting forces in the desired direction. The important thing is that the conventional ABC, ACB phase relationships on either side be maintained on that side so as to achieve the desired direction of force on the secondary. The primary windings are arranged as a typical a three-phase winding. However, it should be understood that any number of phases can be designed including six and twelve phases. Moreover, other alternative configurations for the arrangements of the windings are possible. The minimum number of phases is two. In addition while the embodiments have been described as having two sets of three phase windings (6 coils 160 per side) any number are possible. Moreover, while the embodiments herein have been described with respect to a two sided primary 137 each side having six coils, other configurations are possible, including a single core with a two sided winding instead. Again, any configuration of core 150 and winding 160 arrangement for the primary 137 is possible and may be envisioned. Furthermore, it should be appreciated that while in an embodiment the primary 137 and windings 160 have been described with respect to a dual three phase set of windings (e.g., sequence of phases A, B, C, A, B, C), the configuration of the primary and the windings may be identical and only the electrical connection and controller 115 governing how the coils 160 are sequenced and excited changes.

In FIGS. 3, 4 and 5A-C, the winding configurations consist of two, one-layer, overlapping, multi-phase winding configurations which are conventional in single sided flat linear induction motors known to the art. The windings may be driven in series or in parallel, a series connection generally being preferred in order to avoid excessive current and magnetic imbalance as between the various winding sets. In each set of windings is wound between slots adjacent to the same surface of the core, so all segments of each winding are on the same side of the core.

Figure 6A:
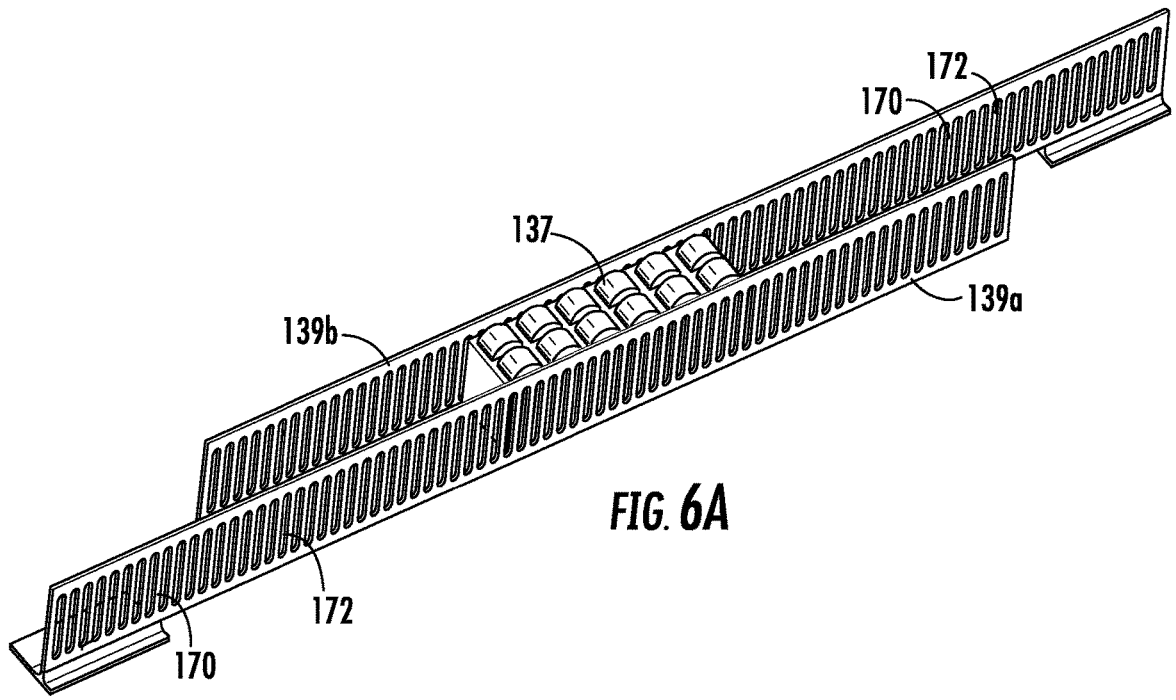
FIG. 6A is a perspective view of the door opener motor of with slotted secondaries in accordance with an embodiment.
Figure 6B:
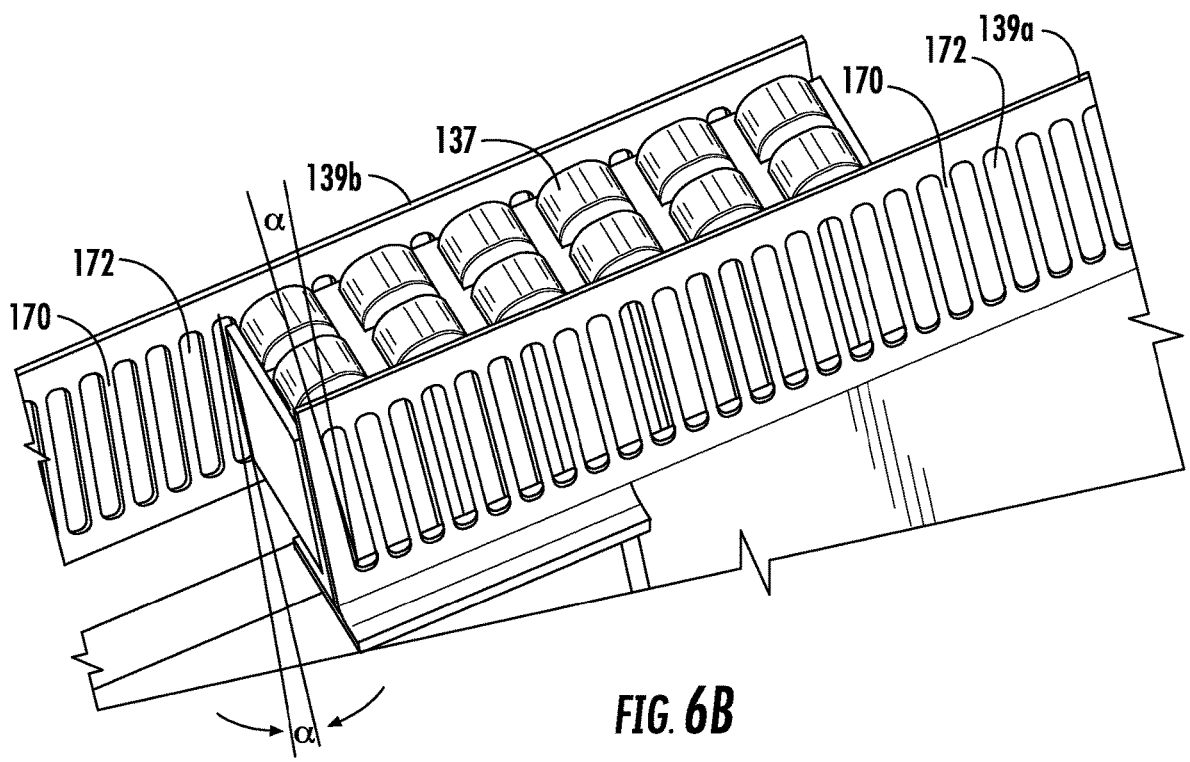
FIG. 6B is an expanded perspective view of a door opener motor in accordance with an embodiment.

Turning now to FIGS. 6A and 6B depicting one embodiment of the secondary structure 139*a*, and 139*b*. In an embodiment, the active portion of secondary 139*a*, 139*b* may be formed of a simple piece of magnetic material, e.g. ferrous, substantially rectangular in shape as described above. The secondary 139*a*, 139*b* is configured with a magnetically engaging (presence of ferromagnetic) salient portions 170 and a magnetically non-engaging (absence of metal) low or non-salient portions 172 distributed substantially along its length. The salient portions 170 and non-salient portions 172 are approximately the same height as the teeth 156 on the primary 137. In an embodiment, the non-salient portion 172 is formed as a plurality of slots cut or punched therein to form the salient portion 170 as teeth (e.g., similar to a ladder with rungs). The teeth 170 are spaced to avoid aligning with the poles and teeth 156 of the primary 137 in a conventional manner as would be understood in the art to avoid thrust ripple. In an embodiment the salient teeth 172 are spaced linearly along the length of the secondaries 139*a*, 139*b* at a spacing ⅝ths of that of the teeth 156 of the primary 137, though many other spacings are possible.

Figure 6C:
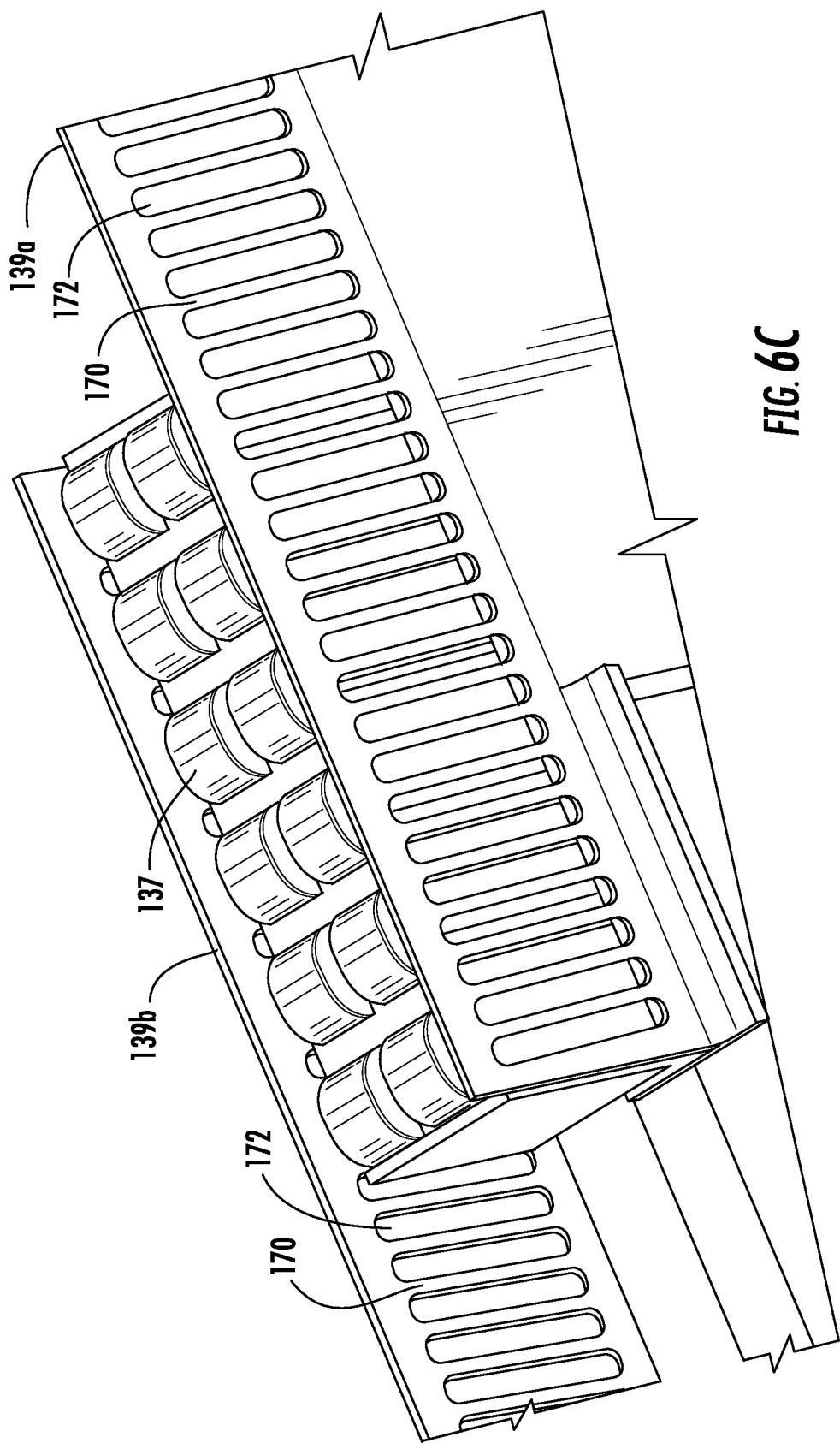
FIG. 6C is an expanded perspective view of a door opener motor in accordance with an embodiment.

FIGS. 6B and 6C also illustrate a variation in which the teeth 156 of the two sided primary 137 may be angled or skewed or likewise the teeth 170 of the secondaries 139*a* 139*b* may be angled with respect to the primary 137. The teeth of the primaries 137 or the secondaries 139*a*, 139*b* may be skewed to improve thrust ripple in the PM linear motor 135. Although shown with regard to the embodiment of FIG. 3, this variation is applicable to each of the aforementioned embodiments in FIGS. 3, 4, & 5A-C. The term "angled" as used herein means rotated an angle α from a plane perpendicular to the direction of thrust on the secondaries generated by the interaction of the primary 137. The angle α denoted for the primary teeth 156 is the angle may be in the range of about −60° to about 60° from the plane perpendicular to the direction of thrust on the secondaries 139*a* and 139*b* generated by interaction with the primary 137. Skewing the teeth or the arrangement of the primary 137 or the teeth 170.

Figure 7A:
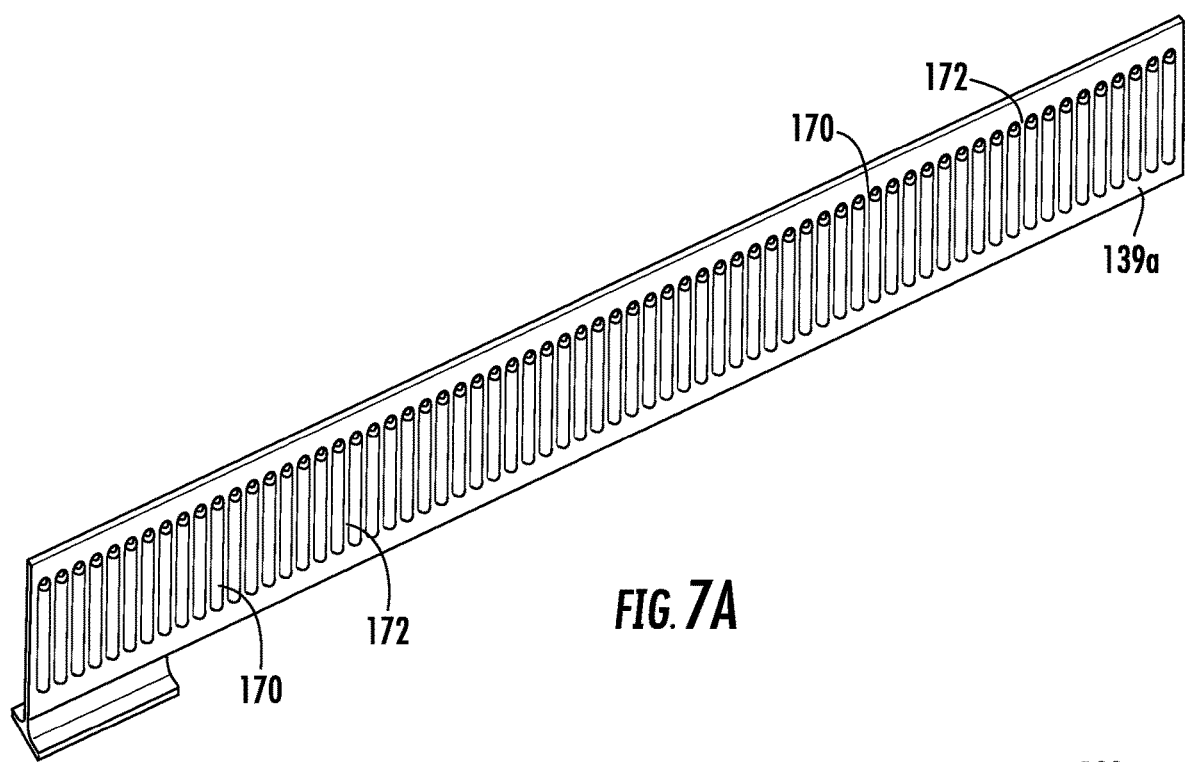
FIG. 7A is a perspective view of a corrugated secondary in accordance with an embodiment.
Figure 7B:
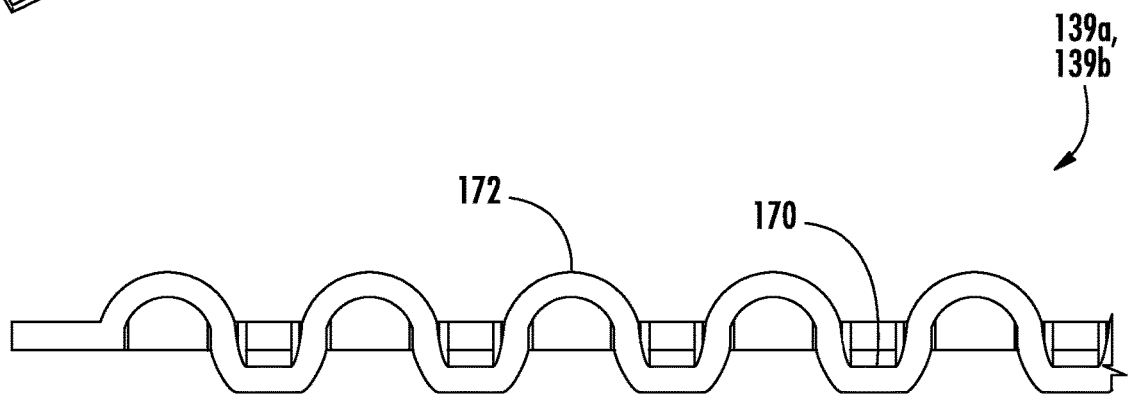
FIG. 7B is a partial end view of a corrugated secondary in accordance with an embodiment.
Figure 7C:
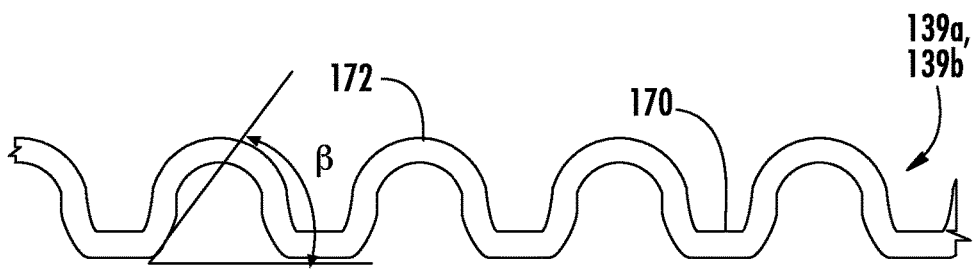
FIG. 7C is a partial cross sectional view of a corrugated secondary in accordance with an embodiment.

Turning now to FIGS. 7A-7C depicting another embodiment of the secondary structure 139*a*, and 139*b*. In an embodiment, the secondary 139*a*, 139*b* may be formed of a simple piece of magnetic material, e.g. ferrous, substantially rectangular in shape as described above. The secondary 139*a*, 139*b* is configured with magnetically engaging or salient portions 170 and a magnetically non-engaging (non-salient portions 172 distributed substantially along its length. Once again, the salient magnetically engaging portions 170 and non-salient magnetically non-engaging portions 172 are approximately the same height as the teeth 156 on the primary 137. In an embodiment, the secondaries 139*a*, 139*b* are formed as a plurality of corrugations stamped or pressed into the metal along its length to form the salient magnetically engaging portion 170 as teeth (e.g., bumps proximal to the primary) and the non-salient non-engaging portions 172 are dimples (where the metal is far enough from the magnets of the primary to not be engaging. Once again, the teeth 170 are spaced to in an arrangement of ⅝ths the spacing of the teeth 156 of the primary 137 in a conventional manner as would be understood in the art.

FIG. 7C also illustrates yet another variation that may be employed to reduce thrust ripple. In one embodiment, the teeth 156 of the two sided primary 137 may be angled or skewed as describe above with respect to FIG. 6C, that is, rotated an angle α from a plane perpendicular to the direction of thrust on the secondaries generated by the interaction of the primary 137. In another embodiment as depicted in this figure, the salient portion of secondary 170 or "dimples" may be rounded or chamfered at the edges as illustrated by angle β. The term "angled" as used herein means rotated an angle β from a plane of the faces of the teeth 170 of the secondaries 139*a*, 139*b*. Thus, the orientation of the teeth 156 or their shape and features maybe shaped to adjust the thrust ripple introduced in the PM linear motor 135.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set), or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A switched flux linear motor for driving a secondary, comprising:
    a primary comprising a magnetically permeable core having a first face surface on a first side of the core, a plurality of teeth forming a plurality of slots on the first side, and a plurality of multiphase windings wound to have segments thereof in the slots forming a plurality of magnetic poles at the first face surface and a second face surface on a second side of the core opposite to the first side, the second face surface including a second plurality of teeth forming a second plurality of slots on the second side, and a second plurality of multiphase windings wound to have segments thereof in the slots forming a plurality of magnetic poles at the second face surface;
    a permanent magnet pair of opposing polarity configured to cause the primary to exert a force on the secondary when the plurality of multiphase windings are excited by a multiphase source; and
    a ferromagnetic secondary adjacent to but spaced from the first face surface, the ferromagnetic secondary being moveable with respect to the primary;
    wherein the permanent magnet pair includes a first magnet and a second magnet, the first magnet positioned is a first slot of the plurality of slots on a first side of a first tooth of the plurality of teeth, the second magnet positioned is a second slot of the plurality of slots on a second side of the first tooth of the plurality of teeth, the second side of the first tooth being opposite the first side of a first tooth;
    wherein each of the plurality of multiphase windings is associated with a phase and each of the second plurality of multiphase windings is associated with a phase, the phase of each of the second windings of the second plurality of multiphase windings matching the phase of a corresponding one of the plurality of multiphase windings directly opposite each second winding of the second plurality of multiphase windings on opposite sides of the core.

2. The switched flux linear motor of claim 1 further including a second ferromagnetic secondary adjacent to but spaced from the second face surface and moveable with respect to said core independently of said ferromagnetic secondary.

3. The switched flux linear motor of claim 2 wherein the plurality of multiphase windings and the second plurality of multiphase windings are arranged in a manner and excited in a manner to cause the first ferromagnetic secondary and the second ferromagnetic secondary to move in opposite directions.

4. The switched flux linear motor according to claim 2 wherein:
    said plurality of multiphase windings on said first side of said core are wound to have the same mutual phase relationship to each other when viewed from said first side as the mutual phase relationship which said second plurality of multiphase windings on said second side have, when viewed from said second side, whereby to drive said ferromagnetic secondary and second ferromagnetic secondary in mutually opposite directions.

5. The switched flux linear motor according to claim 2 wherein said plurality of multiphase windings on said first side are wound to be phase reversed, when viewed from the top, from said second plurality of multiphase windings on said second side, whereby to drive said ferromagnetic secondary and said second ferromagnetic secondary in opposite directions.

6. The permanent magnet linear motor according to claim 2 further comprising:
    a linear motor drive for supplying currents to at least one of the plurality of multiphase windings and the second plurality of multiphase windings for selectively driving each respective ferromagnetic secondary and second ferromagnetic secondary in either one of two directions in dependence on the phase relationships of said currents.

7. The switched flux linear motor according to claim 2 wherein the ferromagnetic secondary is coupled to a first door and the second ferromagnetic secondary is coupled to a second door.

8. The switched flux linear motor according to claim 7 wherein said first door and second door are elevator doors.

9. The switched flux linear motor according to claim 7 wherein said primary is disposed on an elevator car and said first door and second door comprise a pair of center-opening double doors.

10. The switched flux linear motor according to claim 1 further comprising:
a linear motor drive for supplying currents to at least the plurality of multiphase windings in slots of said first face surface for selectively driving the ferromagnetic secondary in either one of two directions in dependence on the phase relationships of said currents.

11. The switched flux linear motor according to claim 1 wherein:
the plurality of multiphase windings are wound so as to provide magnetic poles on the first side and on the second side, the poles on the first side having polarity opposite to polarity of the poles on the second side, whereby to drive the ferromagnetic secondary and second ferromagnetic secondary in mutually opposite directions.

12. The switched flux linear motor according to claim 1 wherein the permanent magnet pair is at least one of disposed at an end of the teeth distal from the ferromagnetic core and forming closed slots, disposed in the ferromagnetic core and magnetized along its length, disposed in the ferromagnetic core and magnetized along its width, and alternatingly disposed in between two portions of a tooth having a winding encompass it.

13. The switched flux linear motor according to claim 1 wherein the ferromagnetic secondary is configured with salient portions and non-salient portions substantially uniformly distributed along at least a portion of the length of the ferromagnetic secondary.

14. The switched flux linear motor according to claim 13 wherein the non-salient portions are formed by punching or removing ferromagnetic material.

15. The switched flux linear motor according to claim 13 wherein the salient portions are positioned at a pitch different that a pitch of the teeth of the primary.

16. The switched flux linear motor according to claim 13 wherein the salient portions are oriented at an angle orthogonal to the force exerted on the ferromagnetic secondary by the primary.

17. The switched flux linear motor according to claim 13 wherein the salient portions are oriented at an angle less than orthogonal relative to the force exerted on the ferromagnetic secondary by the primary.

18. The switched flux linear motor according to claim 13 wherein the salient portions and non-salient portions are formed by pressing and forming corrugations in the ferromagnetic material.

19. The switched flux linear motor according to claim 18 wherein the corrugations are formed such that the depth D of the corrugations is at least 2.5 times the gap between the primary and the salient portions.

20. The switched flux linear motor according to claim 18 wherein the salient portions include an angled portion angled relative to a face of the salient portion.

21. A double sided switched flux linear motor door operator, comprising:
a magnetically permeable core having a first face surface on a first side of the core, a plurality of teeth forming a plurality of slots on the first side, and a plurality of multiphase windings wound to have segments thereof in the slots forming a plurality of magnetic poles at the first face surface and a second face surface on a second side of the core opposite to the first side, the second face surface including a second plurality of teeth forming a second plurality of slots on the second side, and a second plurality of multiphase windings wound to have segments thereof in the slots forming a plurality of magnetic poles at the second face surface;
a permanent magnet pair of opposing polarity configured to direct magnetic flux to the magnetically permeable core; and
a first ferromagnetic secondary adjacent to but spaced from the first face surface and moveable with respect to the core;
a second ferromagnetic secondary adjacent to but spaced from the second face surface and moveable with respect to said core independently of said first ferromagnetic secondary;
a pair of elevator doors, each affixed to one of said first ferromagnetic secondary and said second ferromagnetic secondary, whereby the elevator doors are moved in mutually opposite directions by said first ferromagnetic secondary and said second ferromagnetic secondary;
wherein the permanent magnet pair includes a first magnet and a second magnet, the first magnet positioned is a first slot of the plurality of slots on a first side of a first tooth of the plurality of teeth, the second magnet positioned is a second slot of the plurality of slots on a second side of the first tooth of the plurality of teeth, the second side of the first tooth being opposite the first side of a first tooth;
wherein each of the plurality of multiphase windings is associated with a phase and each of the second plurality of multiphase windings is associated with a phase, the phase of each of the second windings of the second plurality of multiphase windings matching the phase of a corresponding one of the plurality of multiphase windings directly opposite each second winding of the second plurality of multiphase windings on opposite sides of the core.

22. A system according to claim 21 wherein the core is disposed on an elevator car and the doors comprise a pair of center-opening double doors.

* * * * *